J. J. BATE.

Refrigerator Cars.

No. 5,942.

Reissued June 30, 1874.

Witnesses.

James A Whitney

William B. Phair

Inventor.

John J. Bate

N. PETERS, Photo-Lithographer, Washington, D. C.

UNITED STATES PATENT OFFICE.

JOHN J. BATE, OF BROOKLYN, NEW YORK, ASSIGNOR, BY MESNE ASSIGNMENTS, TO WILLIAM W. WICKS AND HANNAH R. BATE, OF SAME PLACE.

IMPROVEMENT IN REFRIGERATOR-CARS.

Specification forming part of Letters Patent No. 146,980, dated February 3, 1874; reissue No. 5,942, dated June 30, 1874; application filed June 19, 1874.

*To all whom it may concern:*

Be it known that I, JOHN J. BATE, of Brooklyn, in the county of Kings and State of New York, have invented certain Improvements in Refrigerating Cars, Chambers, Houses, &c., of which the following is a specification:

The object of my invention is to provide a more equal distribution and consequent diffusion of cooled or refrigerated air throughout a car, chamber, or house used for the preservation and storage of animal and vegetable substances—such, for example, as articles of food—than has hitherto been secured. My invention consists in the combination, within a car, chamber, or house, of an ice-box, through which an artificial air blast or current may be forced in contact with the ice contained in the said box; an outlet-pipe leading from said ice-box, furnished with outlet-orifices and deflecting devices for dividing and distributing to the interior of the chamber the air drawn through the ice-box; and a suitable air-pump or other mechanical means for producing the air current or blast through the said ice-box. My invention further consists in the combination of the ice-box, the mechanical means of inducing the air-current, and the outlet-pipe provided with slots or openings, as hereinbefore indicated, of adjustable slides, so fitted to the said openings of the outlet-pipe that the available size thereof may be adjusted at will to regulate the outflow of air from the pipe, and consequently the extent of the distribution and diffusion of cooled or refrigerated air to the chamber, car, or house. The invention also consists in the combination, within a chamber, as hereinbefore mentioned, of a perforated or slotted air-inlet pipe with the ice-box, the mechanical means of inducing the air-current, and the outlet-pipe provided with openings and deflecting devices for the distribution and diffusion of the air from such outlet-pipe, the inlet-pipe aforesaid serving to readily conduct air to the ice-chamber to supply the place of that passed therefrom to the outlet-pipe, in order to maintain the continuous distribution and diffusion of cooled air from the ice-box to all parts of the inclosing-chamber.

Figure 1:
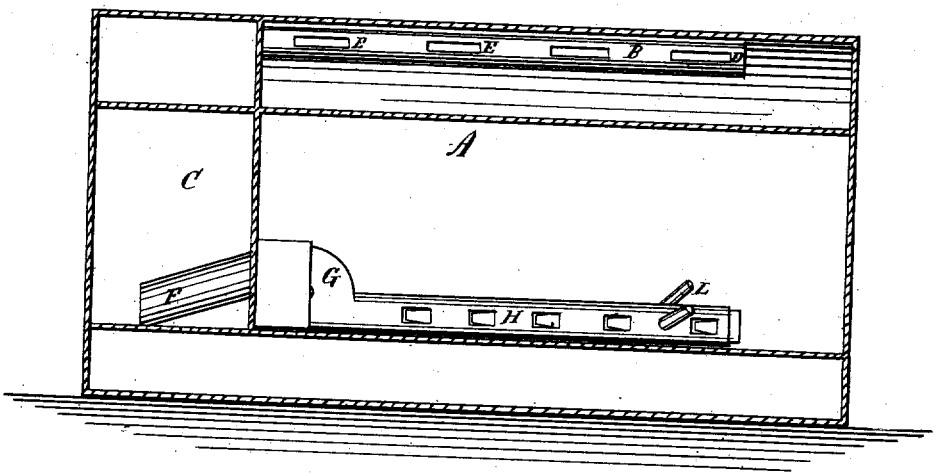
Figure 2:
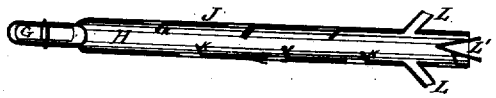

The drawings herewith show, Figure 1, a view of the interior of the car, the side thereof being removed; and Fig. 2, a view of the pipe in connection with the pump, the top of the pipe having also been removed.

In the top or upper part of the car A the pipe B is properly affixed. It will be noticed that this pipe conducts the air from the interior of the car to the ice-chamber C, and that it is open at the end D, and is slotted, as at E. In this pipe a slide may be fitted, and in some instances will be necessary. This slide may be on the interior or exterior of the pipe D, and operated in any convenient manner. It should be provided with slots of the size of those marked E in pipe D, and should register therewith, so that the size of the air-exits may be controlled at pleasure. Through the ice-box or chamber C the air is drawn by a pipe, F, continued from pump G, and is forced through the tube or pipe H into the interior of the car or chill-chamber. The distributing-pipe H has throughout its length openings J, guarded on the inside of the pipe by deflectors K, said deflecting-plates being formed, when tin or soft metal is used, by the tongues or portions of the pipe forced in by a die or punch, which makes the opening J. When the distributing-pipe is of hard or brittle metal, the deflecting-plates are otherwise applied. These openings may be capped by branch pipes, as shown at L, and the end of the main pipes closed, or left open and provided with deflecting-plates L, each and all of which will, to a greater or less extent, accomplish the object which I have in view, viz., to break up and equally distribute the air throughout the car.

This arrangement of means for refrigerating the provision-chambers of cars may be applied to the like chambers of ware or provision houses, and chambers for keeping meats and provisions generally. When so adapted, the fan-blower may be operated by any motive power at hand, or mechanical devices convenient, among which may be included clock movements.

What I claim as my invention is—

1. The combination, within a car, chamber, or house, of the ice-box, constructed for the passage of an artificial air blast or current, the outlet-pipe, formed with the outlet-openings and provided with deflecting devices, and a mechanical means of inducing the air blast or current, substantially as and for the purpose set forth.

2. The combination, with a car, chamber, or house, of the ice-box, the mechanical means of inducing the air blast or current and the slotted outlet-pipe, provided with slides for varying the available size of its outlet-openings, substantially as and for the purpose set forth.

3. The combination of the inlet-pipe to the ice-box, slotted or formed with openings, as described, with the said ice-box, the mechanical means for inducing the air blast or current, and the outlet-pipe constructed with deflectors for distributing the cooled or refrigerated air to the car, chamber, or house, substantially as and for the purpose set forth.

JOHN J. BATE.

Witnesses:
JAMES A. WHITNEY,
WILLIAM B. PHAIR.